Dec. 18, 1934.  C. A. CAMPBELL ET AL  1,984,459
AIR BRAKE
Filed Aug. 5, 1931  2 Sheets-Sheet 1
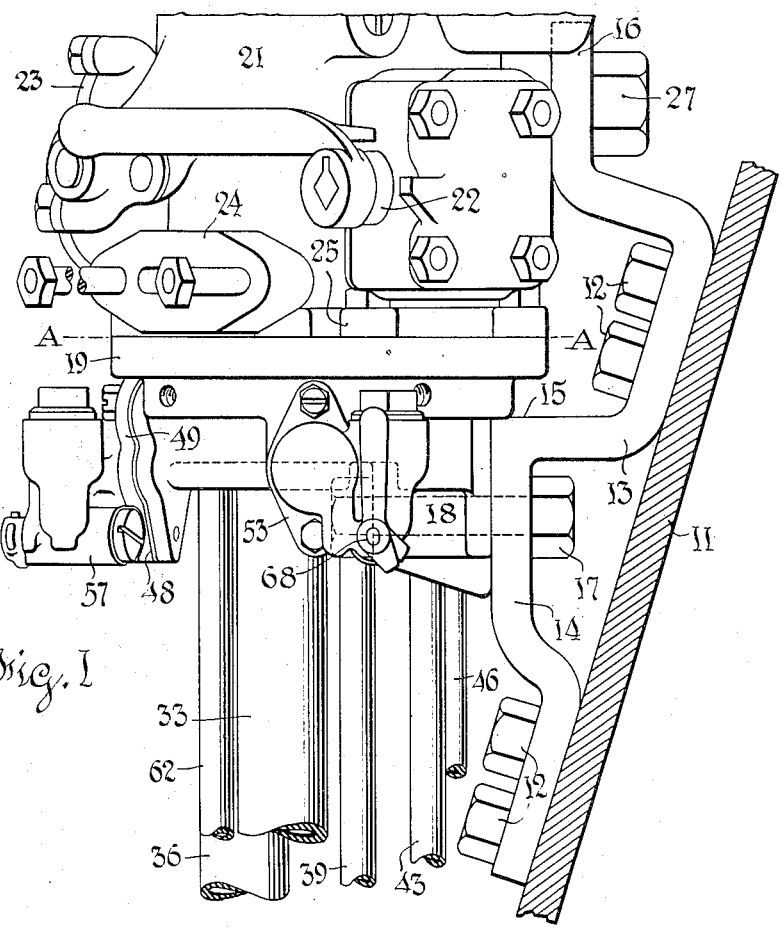
Fig. 1
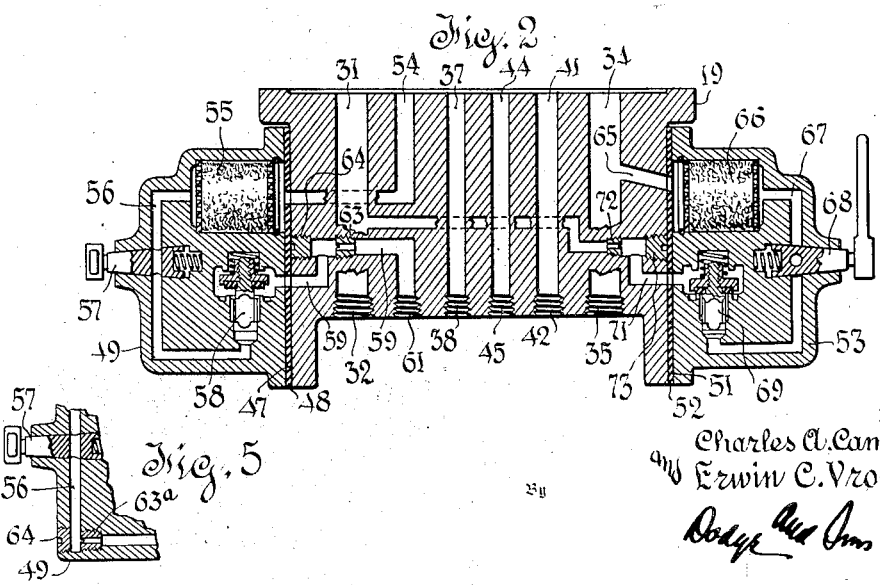
Fig. 2
Fig. 5
Inventor
Charles A. Campbell
and Erwin C. Vroman
Attorneys

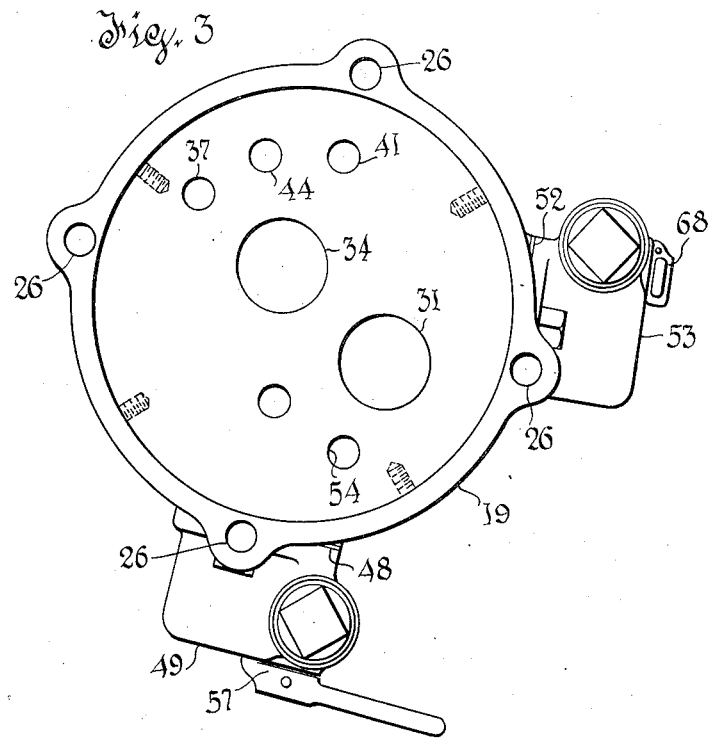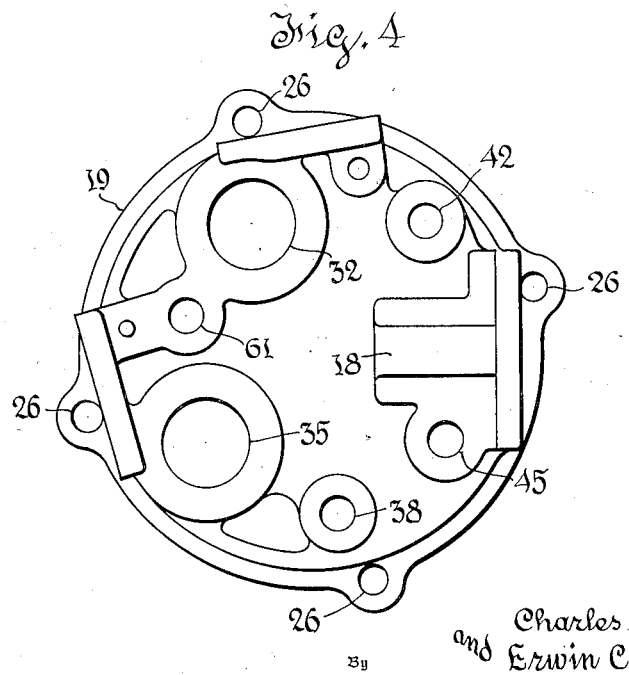

Patented Dec. 18, 1934

1,984,459

UNITED STATES PATENT OFFICE 1,984,459

AIR BRAKE

Charles A. Campbell and Erwin C. Vroman, Watertown, N. Y., assignors to The New York Air Brake Company, a corporation of New Jersey Application August 5, 1931, Serial No. 555,340

3 Claims. (Cl. 303—1)

This invention relates to air brakes, and particularly to engineer's brake valve structures of the pedestal type.

Prior to the present invention it has been proposed to construct the engineer's brake valve with a base or mount to which all the pipe connections are made and to superpose upon and connect with said base a ported pedestal. This pedestal customarily carries most of the accessory apparatus associated with the engineer's brake valve, for example, the double-heading cock, the relay brake pipe vent valve, the feed valve, and the reducing valve for the signal system.

While the base and pedestal have a number of ports to connect various pipes to the engineer's brake valve and to the independent brake valve, if one is used, the ports with which the present invention is concerned are the brake pipe port, the main reservoir port, the signal reducing valve port and a port connected with the signal pipe.

According to the present invention the base is so arranged that the reducing valve port and the signal pipe port both terminate on a mounting face against which is removably mounted a fixture for controlling the signal system. There are also branch ports, one leading from the main reservoir port and the other from the brake pipe port, and both terminating on a second mounting face upon which is removably mounted a second fixture known as the dead engine fixture. The fixtures in question may be substantially identical, as each includes a stop cock, a check valve for controlling the direction of flow through the fixture, and a choke for limiting the rate of flow through the fixture. Each may further include a strainer.

Under normal conditions of operation the stop cock forming part of the signal fixture is open, so that air flows from the reducing valve port through the strainer, stop cock, check valve and choke to the signal pipe to charge the latter. The dead engine fixture is for the purpose of charging the main reservoir on a locomotive which is being hauled dead in the train. The stop cock is closed when the engine is operating normally and is open only when the engine is hauled dead. At such time it permits a flow of air from the brake pipe through the strainer, stop cock, check valve and choke, to the main reservoir. In this way the main reservoir is charged with air from the brake pipe, and during an application will furnish air to the engine and tender brake equipment, which customarily is, for example, of the well known E. T. or L. T. types.

The proposed arrangement reduces the cost of manufacture by permitting a single standardized unit to be used for two purposes. It eliminates much piping heretofore used, and renders both fixtures readily accessible.

The invention is applicable to various types of base, but it will be described as applied to a particular type recently developed and intended to be supported on the end of the locomotive boiler or other approximately vertical surface, the base being so positioned above the floor as to facilitate the making and maintenance of the pipe connections.

The invention will now be described in connection with the accompanying drawings, in which,—

Fig. 1 is an elevation of the base and portions of its connected piping and the lower portion of the pedestal, the parts being shown mounted by means of a bracket on the boiler head.

Fig. 2 is a diagrammatic section through the base and the signal and dead engine fixtures. In this view the ports are drawn as if they all lay in a single plane.

Fig. 3 is a plan view of the base and attached fixtures as actually constructed.

Fig. 4 is a bottom view of the base as actually constructed.

Fig. 5 is a fragmentary view similar to a portion of Fig. 3 and showing a somewhat different location for the chokes.

A portion of a locomotive boiler head is indicated at 11. Fastened to this by machine screws 12 is a wrought steel bracket 13, whose form is indicated in Fig. 1. It is provided with a lower offset 14 forming a shoulder 15 and an upper offset 16.

Resting on shoulder 15 and clamped to offset 14 by bolt 17, which passes through lug 18, is the base 19. It will be observed that the base 19 is supported above the floor of the locomotive cab and thus offers convenient opportunity for the attachment of all pipes which communicate with the engineer's brake valve.

The lower or pedestal portion 21 of an engineer's brake valve unit is shown, and will be understood to conform generally to known construction. Certain accessory apparatus commonly mounted on such a pedestal portion is illustrated generally: the double heading cock at 22, the relay brake pipe vent valve at 23, and the mount 24 for a feed valve (not shown).

The plane of junction between the base 19 and the pedestal 21 is indicated by the line A—A, and the base and pedestal are connected by studs 25 (Fig. 1). Holes for these studs are indicated at 26 in Figs. 3 and 4.

The pedestal 21 is connected releasably with the offset 16 by the machine screw 27, so that the pedestal is steadied by the bracket 13, independently of its connection with base 19.

The construction so far described is not a feature of the present invention and is here described as typical of constructions with which the invention may be used.

The base 19 is provided with ports and pipe connections which can now be described.

The main reservoir port 31 leads from the upper face where it registers with the main reservoir port in pedestal 21, to the lower face where there is a threaded connection 32 for the main reservoir pipe 33.

The brake pipe port 34 leads from the upper face of the base, where it registers with the brake pipe port in the pedestal 21, to the bottom of the base where there is a threaded connection 35 for the brake pipe 36.

Similar through ports registering with ports in pedestal 21, are the application cylinder port 37 with threaded connection 38 for application cylinder pipe 39; the distributing valve release port 41 with threaded connection 42 for the distributing valve release pipe 43; and the equalizing reservoir port 44 with threaded connection 45 for the equalizing reservoir pipe 46.

Mounted on a ported face 47 with intervening ported gasket 48 is the body 49 of the signal fixture.

Mounted on a ported face 51 with intervening ported gasket 52 is the body 53 of the dead engine fixture.

A port 54 leads from the upper face of base 19 (where it registers with the signal line reducing valve port in pedestal 21) to the mounting face 47. There it discharges into a curled hair strainer 55 confined in body 49. From the strainer a passage 56 leads through a normally open stop cock 57 and through check valve 58 back to mounting face 47. There it communicates with passage 59 which has a threaded connection 61 for signal pipe 62.

An interchangeable choke 63 is screwed into passage 59 to define the rate of flow to the signal pipe. A screw plug 64 gives access to the choke.

If preferred the choke may be located in body 49 instead of base 19, as indicated at 63a in Fig. 5, the exact location of the choke being immaterial. By mounting it in the base 15, it becomes possible to remove the body 49 and its contained parts, and substitute another similar unit without affecting the flow rate. Hence the arrangement indicated in Fig. 2 is preferred.

A branch port 65 leads from the brake pipe port 34 to the mounting face 51. There it communicates with a strainer 66 identical with strainer 55. From the strainer a passage 67 leads through a stop cock 68 (which however is normally closed) and through a check valve 69 back to mounting face 51. There it communicates with passage 71 which leads to main reservoir port 31.

An interchangeable choke 72 is inserted in passage 71 and access to it is had by removing plug 73. If preferred the choke 72 may be located in body 53 instead of in base 19, according to principles already explained with reference to Fig. 5.

Under normal operating conditions, cock 57 is open so that air from the pressure reducing valve in pedestal 21 is fed at a rate determined by choke 63 to the signal line. This function is not in itself new, but the location and pipeless mounting of the signal fixture are new. They greatly reduce the pipe connections and facilitate setting the system for different operating conditions.

Cock 68 is normally closed, but is opened on an engine being hauled dead in a train. Air then flows from the brake pipe at a rate determined by choke 72 to the main reservoir. Thus the main reservoir is charged so that it may furnish air to the engine and tender brakes of the dead engine. The choke 72 holds the charging rate to a value at which there will be no interference with the control of brake pipe pressure exerted by the engineer's brake valve on the leading engine.

This function, broadly considered, is known, but the location and arrangement of the fixture reduce pipe connections and facilitate manipulation.

An important feature is that the two fixtures are essentially identical, thus simplifying manufacture and conducing to economy.

While I prefer to locate the fixtures just described on the base, there being no occasion to disturb them upon removal of the pedestal, they might be mounted at any point on the pedestal brake pipe unit where the desired port connections may be had.

What is claimed is:—

1. In an engineer's brake valve structure, the combination of a base having ports to one of which the signal pipe is connected; a ported member releasably mounted on said base and having ports registering with corresponding ports in the base and including a feed port for the signal system; a signal fixture mounted on said base and including as a unitary structure a stop valve and a check valve controlling flow from the signal feed port to the signal pipe; and an interchangeable choke interposed in the path of such flow, said choke being mounted in said base.

2. In an engineer's brake valve structure, the combination of a base having ports to certain of which the brake pipe and main reservoir pipe are connected; a ported member releasably mounted on said base and having ports registering with corresponding ports in the base and including a main reservoir port and a brake pipe port; a dead engine fixture mounted on said base and including as a unitary structure a stop valve and a check valve controlling flow from the brake pipe port to the main reservoir port; and an interchangeable choke interposed in the path of said flow, said choke being mounted in said base.

3. In an engineer's brake valve structure, the combination of a base having ports to certain of which the brake pipe, main reservoir pipe, and signal pipe are connected; a ported member releasably mounted on said base and having ports registering with corresponding ports in the base and including a feed port for the signal system, a main reservoir port, and a brake pipe port; a signal fixture and a dead engine fixture carried by said base substantially identical with one another and each including a stop valve and a check valve, the first fixture controlling flow from the signal feed port to the signal pipe, and the second fixture controlling flow from the brake pipe port to the main reservoir port; and interchangeable chokes one interposed in each path of flow, said chokes being mounted in said base.

CHARLES A. CAMPBELL.
ERWIN C. VROMAN.